J. M. VASCONCELLOS.
PLANTER.
APPLICATION FILED SEPT. 2, 1916.
1,239,646.
Patented Sept. 11, 1917.
2 SHEETS—SHEET 2.
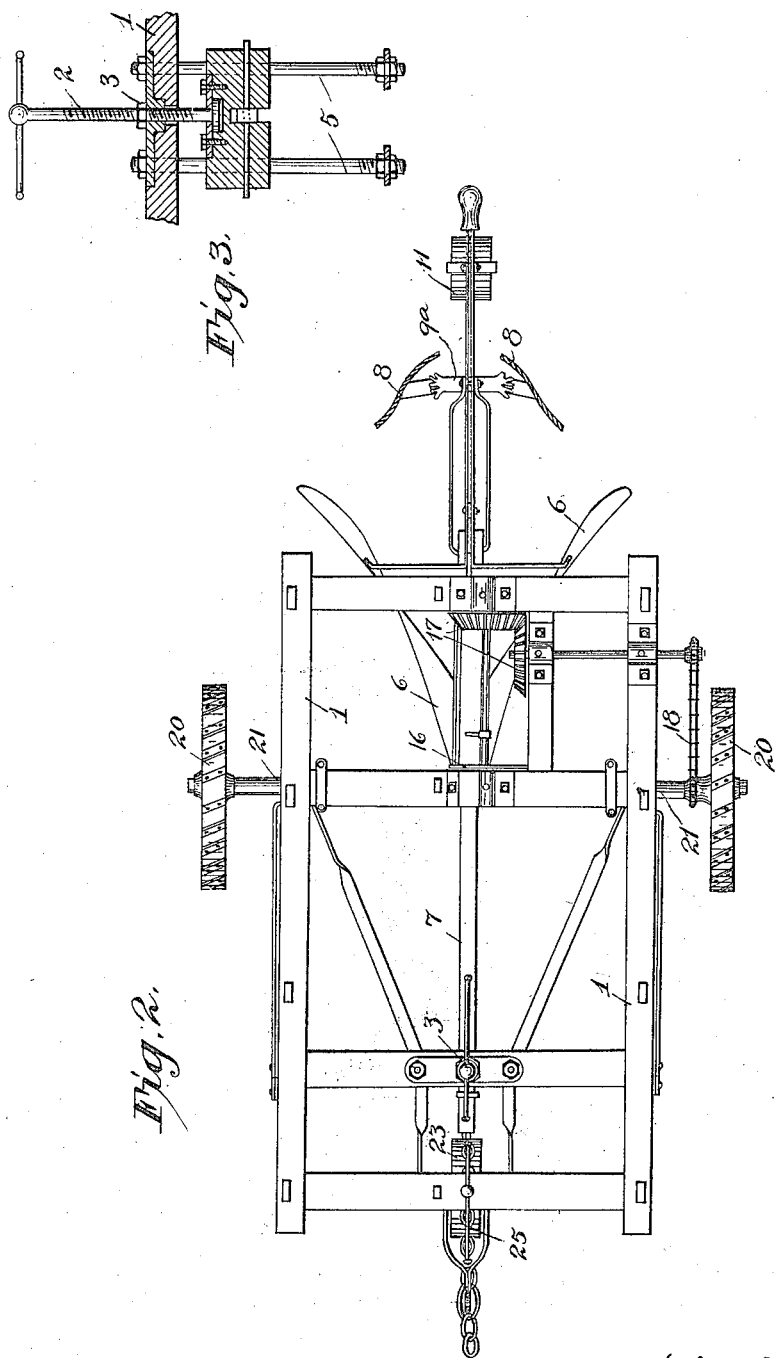
INVENTOR:
José Motta Vasconcellos
BY Wm Wallace White,
ATTY

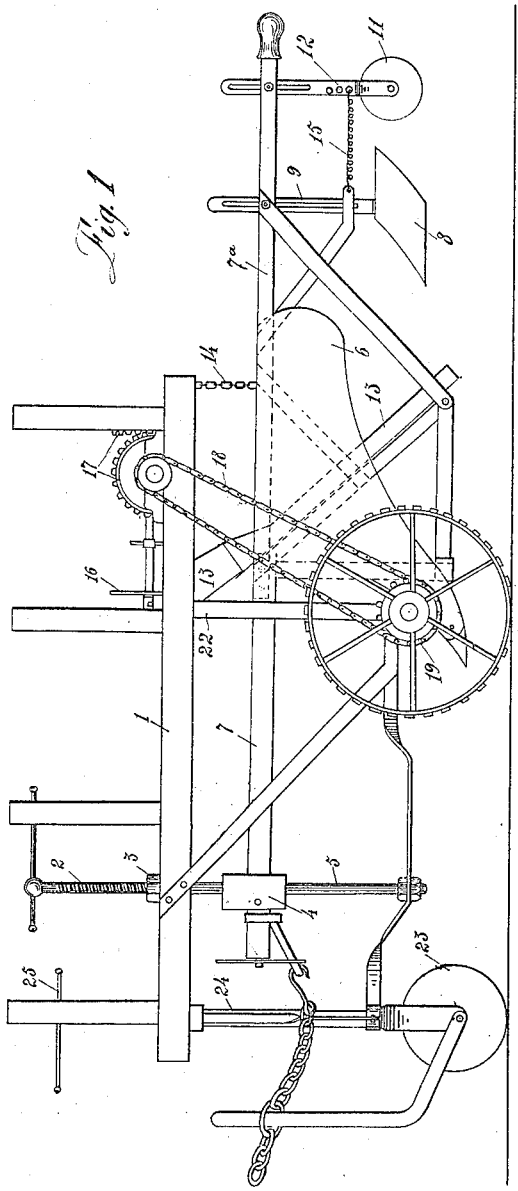

UNITED STATES PATENT OFFICE.

JOSÉ MOTTA VASCONCELLOS, OF RIO DE JANEIRO, BRAZIL.

PLANTER.

1,239,646.

Specification of Letters Patent.   Patented Sept. 11, 1917.

Application filed September 2, 1916.   Serial No. 118,230.

*To all whom it may concern:*

Be it known that I, JOSÉ MOTTA VASCONCELLOS, agriculturist engineer, a citizen of Brazil, residing at Rio de Janeiro, Brazil, have invented new and useful Improvements in Planters, of which the following is a specification.

The invention refers to a sugar-cane planter which may also be used for planting or sowing other plants or seeds.

Up to now the work of planting sugar-cane has been done by manual labor, as there have been no machines adapted for such purpose. Manual labor, is relatively expensive, slow and imperfect and, at times, there is difficulty in finding hands for carrying on the same. By using a machine such as disclosed herein, the planting of cane is effected with rapidity and small outlay.

In the accompanying drawings forming part hereof, I have illustrated a form of embodiment of the invention, in which drawings similar reference characters designate corresponding parts and in which Figure 1 is a side elevation of the said planter. Fig. 2 is a plan view the lower part or frame of the car being omitted. Fig. 3 is a cross-section of the elevating means.

A planter, according to the invention, comprises a car 1, in which a raising and lowering apparatus is fitted, of any adequate type, and which, in the machine here represented, consists of a vertical screw 2, which rotates upon a nut 3 fixed in the car; a follower 4 mounted in order to be moved vertically by means of the lifting apparatus (in this case by the screw 2); means for guiding the follower in its vertical movements and which in the machine shown consists of two vertical columns 5, 5, fixed to the car 1, and which pass through holes in the follower; a plow 6, whose beam 7 is fixed at its front end so as to oscillate vertically in the follower 4; a pair of moldboards 8 fixed upon a post 9, secured in an adjustable manner upon an extension 7ª of the beam 7; a roller 11 mounted upon a bar 12 secured in an adjustable manner to the back end of the extension 7ª of the beam 7; a spout or tap 13 fixed on to the car having its lower end placed between the plow 6 and the pair of moldboards 8; means for suspending the plow in an inoperative position, such means being shown in the example shown by a chain 14, which is hooked on to the beam or to some other part of the frame.

The plants are transported on the frame. The operator on a seat (not shown) on the frame, after having unhooked the chain 14 which suspends the plow, regulates the depth of the furrow by raising or lowering the follower 4 by means of the apparatus 2, and the car being put in movement in the direction in which it is desired to open the furrow, while the plow 6 opens the furrow, the operator throws the sprouts of the cane into the spout, or those of other plants or simple seeds; the moldboard 8 reaches the trench in order to cover the plants with part of the earth which has been removed by the plow, and the roller 11 comes into operation for leveling the ground.

In the example shown, 15 is a spring connected to the shaft 12 of the roller 11 and to a fixed part in the extension 7ª of the beam of the plow. This spring permits the shaft of the roller to oscillate backward in the event of the roller coming in to contact with any obstacle which might damage it. 16 indicates a rotary knife, mounted above the spout 13 and moved by gearing 17 actuated by a chain 18 which passes over a sprocket-wheel 19 fixed on one of the wheels 20 of the car. The knife 16 cuts the cane in pieces which pieces then fall into the furrow through the spout 13.

The car may be supplied with a hopper for holding the sprouts or seeds, and this hopper may be provided with an automatic feeding-apparatus moved by hand or by the transmission of force obtained from one of the wheels of the car itself, or by means of any suitable motive power.

The wheels 20 of the car are mounted on laterally extending trunnions 21, fixed on to the supports 22 in the structure of the frame, leaving sufficient space between the wheels for the plow and other elements. The car has a guiding means which, in the example shown, consists of one wheel 23, mounted upon a vertical rotary rod 24 which may be operated by a hand-steering lever 25.

Both the moldboards 8 and the roller 11 are mounted so that they can be adjusted vertically and in the example shown, the inclination of the moldboards 8 in relation one to the other, can also be adjusted. To this end the moldboards 8 and the horizontal rod 9ª attached to the bar and in which the moldboards are mounted, have their ends in the form of cogged segments and a bored hole in the center of each segment and each moldboard 8 has a tail-end with two slots, one of which coincides with the already-mentioned slot in the bar 9ª, and the other with one of the spaces desired of the teeth of the segments. A two-pointed clip, one of which passes through the holes in the moldboard and in the bar, and the other by the other hole in the moldboard and by the intervening spaces of the teeth of the segment, with bolts at the ends of the points for nuts which tighten the clip so as to fasten the moldboards.

Having thus fully described my invention, what I claim as new and desire to secure by Letters Patent is:

1. In a planter, the combination of a wheel supported frame, cane chopping mechanism mounted on the frame, a plow beam pivotally secured to the frame, a furrow opener on said beam, means for guiding chopped cane from the chopping element downward to the furrow made by said furrow opener, a rearward extension secured to said plow beam, a pair of moldboards adjustably secured to the extension and adjustably held in relation to each other, and a roller adjustably secured to said extension in the rear of the moldboards.

2. A planter comprising a vehicle frame, a beam adjustably carried by the frame and having a rearward extension, a standard secured to said rearward extension, moldboards adjustably mounted on the standard, a roller having a supporting standard pivotally and adjustably carried by the rearward extension in the rear of the moldboards, and a resilient member having one end secured to said roller supporting standard and its opposite end secured to a part of said rearward extension.

In testimony whereof I have signed my name to this specification in the presence of two subscribing witnesses.

JOSÉ MOTTA VASCONCELLOS.

Witnesses:
SYDO TAVARY DE CHEIRZ,
JOSÉ CARLOS DE CHELMICKI AFFLALO.